United States Patent [19]

Elliot

[11] Patent Number: 5,610,523
[45] Date of Patent: Mar. 11, 1997

[54] METHOD AND APPARATUS OF INTERROGATING A VOLUME OF MATERIAL BENEATH THE GROUND INCLUDING AN AIRBORNE VEHICLE WITH A DETECTOR BEING SYNCHRONIZED WITH A GENERATOR IN A GROUND LOOP

[76] Inventor: Peter J. Elliot, 17 Grandview Avenue, Urrbrae, State of South Australia, Australia

[21] Appl. No.: 146,052

[22] PCT Filed: Apr. 15, 1992

[86] PCT No.: PCT/AU92/00166

§ 371 Date: Oct. 29, 1993

§ 102(e) Date: Oct. 29, 1993

[87] PCT Pub. No.: WO92/19989

PCT Pub. Date: Nov. 12, 1992

[30] Foreign Application Priority Data

May 6, 1991 [AU] Australia .............................. PK 5976
Aug. 14, 1991 [AU] Australia .............................. PK 7768
Sep. 6, 1991 [AU] Australia .............................. PK 8223

[51] Int. Cl.⁶ .............................. G01V 3/16; G01V 3/17
[52] U.S. Cl. .............................. 324/330; 324/334
[58] Field of Search .............................. 324/330, 331, 324/334, 335, 357, 202

[56] References Cited

U.S. PATENT DOCUMENTS

| | | | |
|---|---|---|---|
| 2,635,134 | 4/1953 | Jenny | 324/331 |
| 3,105,934 | 10/1963 | Barringer | 324/330 |
| 3,836,841 | 9/1974 | Morrison | 324/330 X |
| 3,950,695 | 4/1976 | Barringer | 324/334 |
| 3,984,759 | 10/1976 | St. Amant et al. | 324/336 X |
| 4,054,881 | 10/1977 | Raab | 324/227 |
| 4,247,821 | 1/1981 | Buselli et al. | 324/336 |
| 4,258,321 | 3/1981 | Neale, Jr. | 324/334 |
| 4,372,398 | 2/1983 | Kucks | 324/346 |
| 4,837,514 | 6/1989 | Spies | 324/336 |
| 4,875,646 | 10/1989 | Browning et al. | 324/458 |
| 5,025,218 | 6/1991 | Ramstedt | 324/334 |

FOREIGN PATENT DOCUMENTS

| | | | |
|---|---|---|---|
| 625063 | 8/1961 | Canada | 324/330 |
| 0052052 | 5/1982 | European Pat. Off. . | |
| 0052053 | 5/1982 | European Pat. Off. | 324/331 |
| 3228447 | 2/1984 | Germany . | |
| 119639 | 9/1958 | U.S.S.R. | 324/330 |
| 883465 | 11/1961 | United Kingdom . | |

OTHER PUBLICATIONS

Bosschart, R.A., Seigel, H.O., 1972 "Advances In Deep Ponetration Airborne Electromagnetic Methods. Conference Proceedings", 24th IGC, Section 9, pp. 37–48.

Howland-Rose, A.W., Linford, G., Pitcher, D.H., Seigel, H.O. 1980a "Some Recent Magnetic Induced Polarisation Developments" Part I–Theory, Geophysics V. 45 N. 1, pp. 37–54.

(List continued on next page.)

*Primary Examiner*—Sandra L. O'Shea
*Assistant Examiner*—Jay M. Patidar
*Attorney, Agent, or Firm*—Quarles & Brady

[57] ABSTRACT

A method of interrogating a volume of material beneath the ground. According to the method a transmitter is located to extend over and be supported by a surface area of ground encompassing and beneath which lies the volume of material. A generator device is used to generate transient electromagnetic pulses within the transmitter. An airborne vehicle, aboard which is a detector, is used to fly over the area of ground. The detector and the generator are synchronized to one another so that the detector has information regarding when the transient electromagnetic pulses are generated. The detector detects the resultant electromagnetic field of the transient electromagnetic pulses, which have certain magnitude and temporal characteristics. A received signal is formed by the detector, which signal is dependant upon the magnitude and the temporal characteristics of the detected electromagnetic fields. The received signal is thereafter processed to determine characteristics of the volume of material.

37 Claims, 2 Drawing Sheets

OTHER PUBLICATIONS

Howland–Rose, A. W., Linford, G., Pitcher, D.H., Seigel, H.O. 1980B, "Some Recent Magnetic Induced Polarisation Developments" Part II–Survey Results, Geophysics V. 45 N. 1, pp. 55–74.

Seigel Asso. Australasia 1971 Turair: "A recent Development In Semi–Airborne Electromagnetic Prospecting" Bull. Austr. Soc. Expl. Geophys. V. 2 N. 3, pp. 25–45.

Sherif, R.E. 1984 "Encyclopedic Dictionary of Exploration Geophysics," Published SEG (USA)., pp. 184–186, 306.

Spies, "TEM in Australian Conditions," Research in Exploration Geophysics, Macquarie University, Mar. 1980, pp. 1–222.

Spies, D.W. Emerson (ed) Bulletin of Aust. Soc. Expl. Geophysics, vol. 11, pp. 130–139.

Nabighian, "Quasi–static Transient Response of a Conductive Half–space: an Approximate Representation," Geophysics vol. 44, pp. 1700–1705.

Howland–Rose et al., "Some Recent Magnetic Induced Polarisation Developments," Geophysics, vol. 45, Parts I and II pp. 37–74.

Seigel, H.O. 1974, "The Magnetic Induced Polarisation Method," Geophysics vol. 39, pp. 321–339.

METHOD AND APPARATUS OF INTERROGATING A VOLUME OF MATERIAL BENEATH THE GROUND INCLUDING AN AIRBORNE VEHICLE WITH A DETECTOR BEING SYNCHRONIZED WITH A GENERATOR IN A GROUND LOOP

FIELD OF THE INVENTION

This invention relates to an apparatus and method of interrogating target areas below the ground for exploration purposes such as, for example, geological surveying. The invention also relates to the application of TEM (Transient Electromagnetic Method), MMR (Magnetometric Resistivity) and MIP (Magnetic Induced Polarisation) analysis to a survey of this type.

BACKGROUND OF THE INVENTION

It is conventional, with TEM schemes, to use an airborne system in which a transmitter loop is located with or within an aircraft, and the associated receiver sensor is also carried by the same aircraft.

Such technique is very efficient in so far that a very large area can be covered in a relatively short time but because the size of the transmitter loop is inherently limited there is a limitation as to the effective depth that can be interrogated with such an arrangement.

On the other hand, by using a ground based transmission antenna, the size of the antenna can be very large indeed but it will inherently take significant time to move throughout the area to take appropriate readings.

Currently MMR and MIP surveys are conducted on the ground using a ground based transmitter and ground based receiver. As mentioned above, the main limitation of this approach is that it is slow and requires ground access to all portions of the survey area. This makes these survey methods relatively expensive.

One form of this invention can comprise a method of interrogating volume of material beneath the ground which comprises locating a ground based loop or grounded conductor across any area to be surveyed, effecting transient electromagnetic pulses into the ground based loop or grounded conductor, and detecting the results of such transient electromagnetic pulses from an airborne vehicle.

Such an arrangement has been found to provide very significant advantages over that which has gone on hitherto.

Nobody seems to have hitherto realized that by separating the transmitter loop from the airborne vehicle the loop can be made very large indeed can be located conveniently and extensively in a close position relative to the ground and significant time can be saved. Having a receiver carried by an airborne vehicle, such as either a helicopter or a fixed wing aeroplane, the gathering of information can be quickly achieved. The receiver itself can be highly sensitive and the detector can be carried either in an aeroplane or other airborne vehicle or preferably, in a bird towed behind the airborne vehicle. The receiving sensor can feed the signals into a memory means within the vehicle. All of these features in combination provide very significant advantages.

The advantages provided by this arrangement include an increased signal to noise ratio and, furthermore, the effects of the electromagnetic transient pulse can be measured out to longer time intervals which have the advantage of enabling a deeper depth to be interrogated.

One of the difficulties in using a ground based transmitter and an airborne sensor is that the signal power must be very high in order to give a sufficient signal over a loop that necessarily becomes very large. There has also been a major difficulty in being able to effect a sufficiently large power supply which, at the same time, can provide a signal of sufficient quality for such purposes.

A second problem has been that in order to effect useful readings, the sensor or the receiver must be able to be extremely and accurately synchronized or at least have access to synchronizing signals from the ground loop.

It is now possible to achieve a sufficiently accurate synchronization calibration which will hold at least over a few hours. The calibration is achieved by having very highly accurate crystal control oscillators which are first brought into an identical frequency oscillation and, then, prior to being separated, are calibrated to a sufficient extent that the receiver, which thereafter will be physically separated from the ground loop or the transmitter of the ground loop, will be able to predict with very great accuracy the start time with respect to each transient electromagnetic pulse. At the same time, the receiver will also be able to predict with great accuracy the cutoff time so that appropriate measurements of the received signals can be made from that cutoff time. This method produces accurate readings appropriate to the pathway that the signal and its environs has travelled.

It will be appreciated that the invention does not concern the specific details of the TEM, MMR or MIP analysis as applied to collected data but to the application of those techniques to data gained using a ground based transmitter and an airborne receiver. Details of TEM, MMR and MIP analysis are well known to skilled addressees as typified by:

Transient Electromagnetic Method (TEM):
- Sherif R. E. 1984 "Encyclopedic Dictionary of Exploration Geophysics", Published SEG (USA).
- Spies B. R. 1980 "TEM in Australian Conditions", Research in Exploration Geophysics, Published Macquarie University.
- Spies B. R. 1980 "Interpretation and design of time-domain EM surveys in areas of conductive overburden", D. W. Emerson (ed) Bulletin of Aust. Soc. Expl. Geophys. Vol. 11. pp13–139.
- Nabighian M. N. 1979 "Quasi-static transient response of a conductive half-space:—An approximate representation", Geophysis Vol. 44. pp 1700–1705.

Magnetic Induced Polarisation Method (MIP) and Magnetometric Resistivity Method (MMR):
- Sherrif, R. E. 1984 "Encyclopedic Dictionary of Exploration Geophysics", Published SEG (USA).
- Seigel, H. O. 1974 "The Magnetic Induced Polarisation Method", Geophysics Vol. 39. pp321 339.
- Howland-Rose, A. W.; Linford, J. G.; Pitcher, D. H.; and Seigel H. O. 1980 "Some recent magnetic induced polarisation developments", Geophysics Vol. 45. parts I and II pp37–74.

SUMMARY OF THE INVENTION

The invention may be said to reside in a method of interrogating a volume of material beneath the ground including:

locating a transmitter means over, in close proximity to or in contact with, a surface area of ground encompassing and beneath which lies the volume of material;

generating with generator means transient electromagnetic pulses within the transmitter means;

flying over the said area of ground with an airborne vehicle aboard which is a detector means;

detecting with the detector means electromagnetic fields resultant of such transient electromagnetic pulses;

forming a received signal dependant upon the magnitude and temporal characteristics of the detected electromagnetic fields; and, processing the received signal to determine characteristics of the volume of material.

Preferably, the method is one of interrogating a volume of material beneath the ground including:

locating a loop antenna over, in close proximity to or in contact with, a surface area of ground encompassing and beneath which lies the volume of material or locating a grounded conductor or conductors in a surface area of ground beneath which lies the volume of material;

generating with generator means transient electromagnetic pulses within the loop antenna or the grounded conductor or conductors;

flying over the said area of ground with an airborne vehicle aboard which is a detector means;

detecting with the detector means electromagnetic fields resultant of such transient electromagnetic pulses;

forming a received signal dependant upon the magnitude and temporal characteristics of the detected electromagnetic fields; and, processing the received signal to determine characteristics of the volume of material.

In preference the method is one including the step of synchronizing the detector means to the generator means thereby synchronizing the detection of the electromagnetic fields with generation of the transient electromagnetic pulses.

Preferably the method is one including the step of processing the received signal using transient electromagnetic analysis techniques, magnetometric resistivity analysis techniques, or magnetic induced polarization analysis techniques.

The method preferably includes the steps of:

forming a digital signal by repetitively digitally sampling the received signal; and, storing the digital signal in a suitable memory means.

In an alternative form, the invention may be said to reside in an assembly adapted to interrogating a volume of material beneath the ground, the assembly including:

a transmitter means located over, in close proximity to or in contact with, an area of ground encompassing and beneath which lies the volume of material;

a generator means adapted to generate transient electromagnetic pulses within the transmitter means;

a vehicle means adapted to fly over the said area of ground aboard which is a detector means;

a detector means adapted to detect electromagnetic fields resultant of such transient electromagnetic pulses;

a receiver means adapted to form a received signal dependent upon the magnitude and temporal characteristics of the detected electromagnetic fields; and, a processor means adapted to provide an output indicative of characteristics of the volume of material.

Preferably the assembly includes:

a loop antenna located over, in close proximity to or in contact with, an area of ground encompassing and beneath which lies the volume of material or a grounded conductor or conductors located in an area of ground beneath which lies the volume of material;

a generator means adapted to generate transient electromagnetic pulses within the loop antenna or the grounded conductor or conductors;

a vehicle means adapted to fly over the said area of ground aboard which is a detector means;

a detector means adapted to detect electromagnetic fields resultant of such transient electromagnetic pulses;

a receiver means adapted to form a received signal dependant upon the magnitude and temporal characteristics of the detected electromagnetic fields; and, a processor means adapted to provide an output indicative of characteristics of the volume of material.

BRIEF DESCRIPTION OF THE DRAWINGS

Preferred embodiments exhibiting the invention will now be described. It will be appreciated that the purpose here is not to limit the invention to any specific detail of the preferred embodiment but to illustrate the invention.

DETAILED DESCRIPTION OF THE PREFERRED EMBODIMENTS

Figure 1:
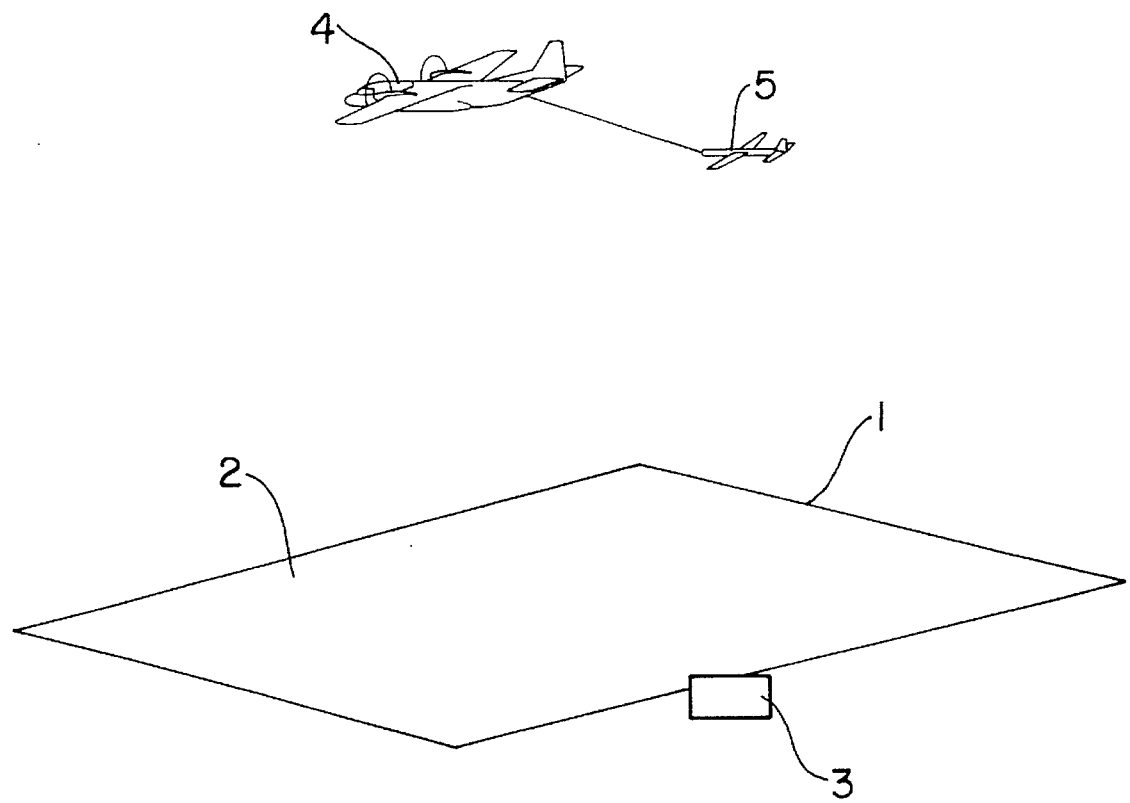
FIG. 1 is a sketch in schematic form of the first preferred embodiment.

Considering the first embodiment, a large loop 1 of wire is laid to extend around an area of ground 2. The loop 1 has dimensions of typically a size such as 5 km by 2 km and is adapted to carry typically 20–45 amperes. This loop acts as a transmitting means.

This configuration produces a magnetic moment much larger than currently available with airborne transmitters. The loop 1 is connected to a generator 3 which is adapted to generate at periodic intervals a voltage to cause the current to flow. The repetition rate of the transmitted signal can be typically in the range of 0.001 Hz to 8000 Hz. This extends much lower than current airborne systems, which operate at approximately 75 Hz, and also much higher. Use of the lower frequency allows longer analysis times with respect to each transmit signal. This has the result of allowing targets at a greater depth to be detected.

With the transmitter loop 1 placed on the ground it is in relatively close proximity to the targets within the ground, such as an ore body. Therefore, the invention overcomes the inherent disadvantage of airborne transmitters being removed from the ground. Further, the loop 1 provides a fixed source for construction of the potential field.

An aircraft 4 is used to tow the bird 5 within which is a receiver sensor. It will be appreciated that of course the aircraft 4 may be a fixed winged aircraft as illustrated or some other aircraft such as a helicopter or a balloon. It will be further appreciated that the receiver sensor may be within the aircraft if desired.

The receiver sensor is adapted to receive the signals transmitted by the transmitter loop 1. The reception of the transmitted signal detects the magnetic field with three orthogonally mounted sensors. This provides a three coordinate measure of the magnetic field at any particular point in time and place (an alternative is to use one only of the sensors, e.g. a horizontal sensor).

The output of the receiver sensors is the three orthogonal signals resultant from the transmit signal. Each of these orthogonal signals are digitally sampled by a digital sampler, an analog to digital converter, to form digital representations of the received signals. The digital information can then be stored on a memory means or analyzed by a digital processing means. It will be appreciated that if processing is being conducted whilst the region is being surveyed and if a helicopter is used and a target is indicated then closer and immediate inspection of the indicated area can be conducted.

Figure 2:
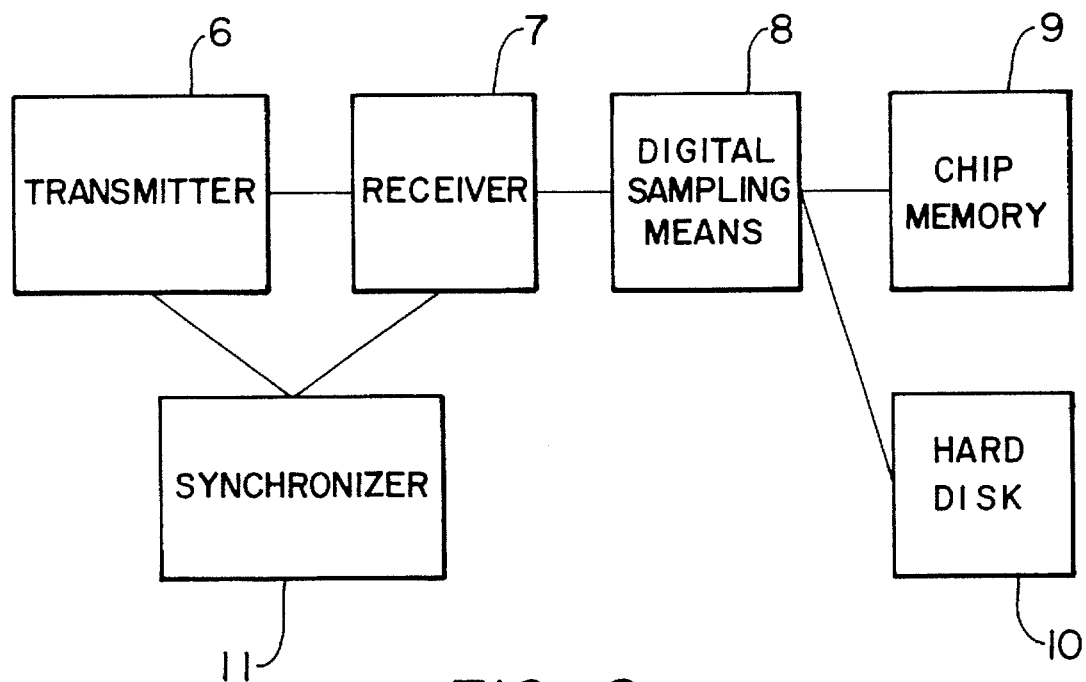
FIG. 2 is a functional block diagram of the embodiment.

Considering the functional diagram as illustrated in FIG. 2 it can be seen that transmitter 6 transmits a signal which is received by receiver 7. The output of the receiver 7, which can be three orthogonal signals, is converted by a digital sampling means 8, an analog to digital converter, 7 into digital signals. The digital signals may then be stored on a memory means 9 in chip memory and then stored in a hard disk 10.

A requirement of time domain electromagnetic analysis, Magnetometric Resistivity and Magnetic Induced Polarisation is that the transmitter 6 and the receiver 7 synchronization is illustrated by block 11. Previous devices have used an umbilical cord between the transmitter and the receiver to provide for the synchronization. This is of course impractical for airborne surveying and it has been found that the transmitter and receiver may be synchronized by the method of crystal synchronization that is to say there are crystal controlled frequency calibration units both on the ground and in the air and these have been brought into accurate calibration both in respect of frequency and in relation to phase relationship to the extent that these can hold the synchronization over a period of some hours at the very least.

Figure 3:
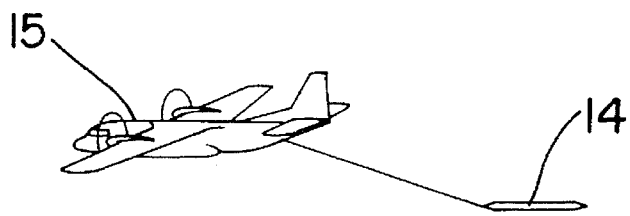
FIG. 3 is a sketch in schematic form of the second preferred embodiment.
Figure 3:
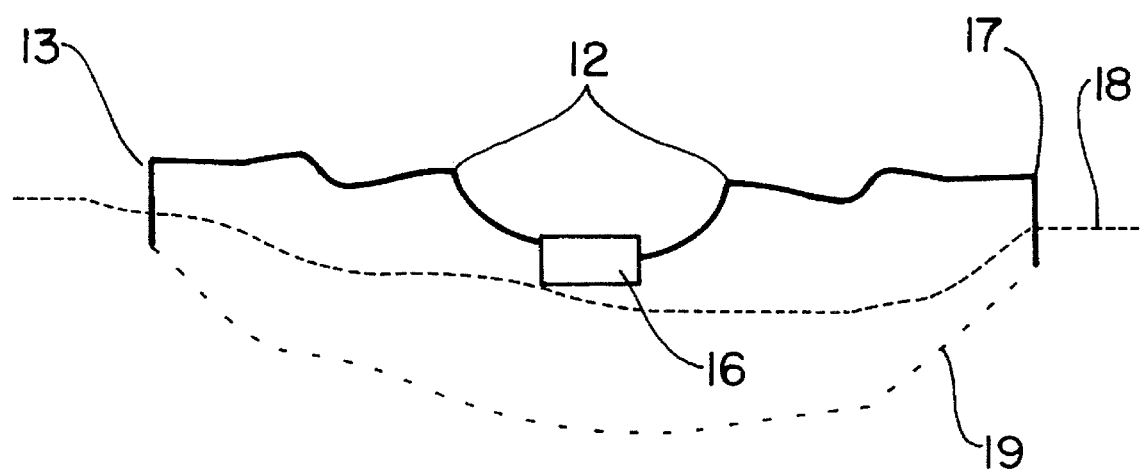

The second embodiment of the invention illustrated in FIG. 3 is similar to the first except that grounded conductors 13 and 17 are used as a transmitter means in place of a loop antenna. The grounded conductors 13 and 17 are driven into the ground 18 and are earthed. The grounded conductors 13 and 17 are powered through cable 12 by a generator 16. This effects the creation of electromagnetic fields by the repeated application of pulses to the grounded conductors 13 and 17. The receiver 7, as for the first embodiment, is within the bird 14 towed by aircraft 15. The receiver 7 may also reside within the aircraft 15. Ground currents 19 are caused to flow between the grounded conductors 13 and 17. The arrangement of the ground conductors and the generator means are known to the field.

A number of the general features of the invention and its application in light of known methods and apparatuses will now be described.

As mentioned above, the analysis methods requires the start of each pulse of the generated transient electromagnetic pulses to be known. To ensure this, it is necessary to synchronize the detector means and the generator means. This can be achieved in a number of ways. A first way is to synchronize crystal oscillator circuits within the generator means and the detector means. For the duration of the survey these oscillators generally maintain sufficient accuracy for the analysis desired. An alternative approach is to transmit a second radio signal which is used to synchronize the detection of the generated electromagnetic field generation of the transient electromagnetic pulses. Such a radio link could be a microwave link.

Ground transient electromagnetic systems are highly sensitive to low amplitude signals because of the long occupation of sites which allows filtering of noise. This is the best known way of finding buried conductive mineralization. Airborne transient electromagnetic systems on the other hand pass over ground fairly quickly and have the transmitter loop above the ground and therefore a distance from the target. They therefore measure transient electromagnetic signals at very early times, thereby limiting the detection of buried conductors simply because, by the time the aircraft has sent its signal into the ground, the aircraft has passed beyond the detection range before all of the preferred signal with a sufficient signal to noise ratio has been received.

It is a feature of the present invention therefore that there be provided a continuous reception of transmitted signals.

It is also important that the airborne platform establishes its location on a continuing basis relevant to the ground position for later reference purposes.

It is also a further significant advantage to use lower frequencies that previously have been considered impracticable with combined airborne transmitting and receiving systems as much again because there is no longer a major problem so far that the sensor will always be within a receiving position while it is within the target area.

The very significant advantage of the invention described relates to cost and time.

For example, to cover 1,000 kilometers on the ground using a large fixed loop and ground reception would take about eighteen months and cost in present Australian Dollars about $500,000. To do the same survey with the proposed invention could be estimated to take possibly only two weeks and cost $80,000 Australian Dollars equivalent.

Further, by use of the present system, it is not necessary to carry the ground receiving apparatus through the target area hence it is no longer a major problem of upsetting the ecology apart from the single ground loop wire.

In brief then, with the loop much closer to the target, it can measure out to much later times and can provide much larger signal levels, thus enabling detection of deeper conductors.

In summary then, the method proposes an arrangement and method by which rapid reconnaissance transient electromagnetics can be extended into areas of thick conductive cover using an airborne platform. Presently all modern airborne transient electromagnetic systems are currently restricted to areas of thin, moderately conductive cover which limits their effectiveness in locating the ore bodies.

It is preferable if the receiver operates in continuous mode. Data thus collected will be dumped to a personal computer, processed and recorded. A modern navigation system such as a differential GPS or Syledis will be tied into the personal computer to give location information which will be recorded relevant to all of the readings as they are taken.

The objective as previously described in reducing the frequency of transmission rate is to allow measurements out to later delay times. However, by reducing the primary frequency, the sample interval is proportionately increased. There is a minimum speed of which fixed wing aircraft can safely fly. A limitation of using an airborne transmitting coil is the maximum magnetic moment that can be achieved currently about as $4.5 \times 10^5$ amps per square meter. The latest systems have improved signal to noise ratio by increasing the transmitter moment to around this level. The limited dimensions of the transmitter loops, however, demand that very high current and very large EMF's be used to achieve this magnitude of moment.

Some of these major limitations can be overcome by placing the transmitter loops on the ground. For example, a transmitter on the ground with dimensions 5 km by 2 km carrying a current of 20 amps will produce a magnetic of $2 \times 10^8$ amps per square meter.

This is some 500 times that which has been previously possible and hence of great importance.

Also, by placing the transmitter loop on the ground removes the need to use a fixed wing aircraft as a platform. It also reduces orientation problems resulting from the close proximity of the sensor to the transmitter loop. This configuration allows a helicopter to be used as the receiver platform since helicopters allow much lower transversing speeds, smaller sample intervals or alternatively lower transmitter frequencies may be achieved. The major advantage in using lower frequencies is it allows later delay times to be utilized, i.e., up to 20 milliseconds.

It is presumed that any sensors can include three sensors orthogonally mounted so as to provide spatially relevant information.

In the arrangement described above, the equipment can be adapted to also conduct frequency domain analysis of the return signals detected.

As can be seen the invention as proposed provides a means to survey a region of ground quickly, economically and efficiently at a greater depth to be detected than previous airborne systems and greater resolutions of such detection.

It will be appreciated that the details of the embodiment of the invention can take many forms. As such these variations which would be apparent to those skilled in the art would fall within the spirit of the invention.

I claim:

1. A method of interrogating a volume of material beneath the ground including:

locating a transmitter means to extend over and be supported by a surface area of ground encompassing and beneath which lies the volume of material;

generating with generator means transient electromagnetic pulses within the transmitter means;

flying over the area of ground with an airborne vehicle aboard which is a detector means;

synchronizing the detector means to the generator means;

detecting with the detector means electromagnetic fields resultant of such transient electromagnetic pulses, said electromagnetic fields having a magnitude and temporal characteristics;

forming a received signal dependant upon the magnitude and the temporal characteristics of the detected electromagnetic fields; and processing the received signal to determine characteristics of the volume of material.

2. A method as in claim 1 wherein the step of synchronizing the detector means to the generator means involves the synchronization of a crystal oscillator in the detector means to a crystal oscillator in the generator means where the oscillators control respectively the generation of a transient electromagnetic pulses and the detection of the resultant electromagnetic field.

3. A method as in claim 1 including the step of processing the received signal using transient electromagnetic analysis techniques.

4. A method as in claim 1 including the step of processing the received signal using magnetometric resistivity analysis techniques.

5. A method as in claim 1 including the step of processing the received signal using magnetic induced polarization analysis techniques.

6. A method as in claim 1 including the steps of:

forming a digital signal by repetitively digitally sampling the received signal; and storing the digital signal in a suitable memory means.

7. A method as in claim 1 where the step of flying is by means of an aeroplane, helicopter or balloon.

8. The method according to claim 1 wherein the step of synchronizing the detector means to the generating means is performed prior to the step of flying over the area with said detector means.

9. The method according to claim 8 wherein the step of synchronizing the detector means to the generator means is performed by synchronizing a crystal oscillator in the detector means to a crystal oscillator in the generator means, where the oscillators control respectively the generation of transient electromagnetic pulses and the detection of the resultant electromagnetic field.

10. The method according to claim 1 wherein the step of synchronizing the detector means to the generating means is performed concurrently with the step of flying over the area with said detector means.

11. The method according to claim 10 wherein the step of synchronizing the detector means to the generating means is performed by means of an RF link between the generating means and the detector means.

12. A method of interrogating a volume of material beneath the ground including:

locating a loop antenna to extend over and be supported by a surface area of ground encompassing and beneath which lies the volume of material or locating a grounded conductor or conductors in a surface area of ground beneath which lies the volume of material;

generating with generator means transient electromagnetic pulses within the loop antenna or the grounded conductor or conductors;

flying over said area of ground with an airborne vehicle aboard which is a detector means;

synchronizing the detector means to the generator means;

detecting with the detector means electromagnetic fields resultant of such transient electromagnetic pulses, said electromagnetic fields having a magnitude and temporal characteristics;

forming a received signal dependant upon the magnitude and the temporal characteristics of the detected electromagnetic fields; and processing the received signal to determine characteristics of the volume of material.

13. A method as in claim 12 including the step of processing the received signal using transient electromagnetic analysis techniques.

14. A method as in claim 12 including the step of processing the received signal using magnetometric resistivity analysis techniques.

15. A method as in claim 12 including the step of processing the received signal using magnetic inducted polarization analysis techniques.

16. A method as in claim 12 including the steps of:

forming a digital signal by repetitively digitally sampling the received signal; and storing the digital signal in a suitable memory means.

17. A method as in claim 12 wherein the step of flying is by means of an airplane, helicopter or balloon.

18. The method according to claim 12 wherein the step of synchronizing the detector means to the generator means is performed prior to the step of flying over said area with said airborne vehicle.

19. The method according to claim 18 wherein the step of synchronizing the detector means to the generator means is performed by synchronizing a crystal oscillator in the detector means to a crystal oscillator in the generator means, where the oscillators control respectively the generation of transient electromagnetic pulses and the detection of the resultant electromagnetic field.

20. The method according to claim 12 wherein the step of synchronizing the detector means to the generator means is performed concurrently with the step of flying over the area with said airborne vehicle.

21. The method according to claim 20 wherein the step of synchronizing the detector means to the generating means is performed by means of an RF link between the generator means and the detector means.

22. An assembly for interrogating a volume of material beneath the ground, the assembly including:

a transmitter means located so as to extend over and be supported by an area of ground encompassing and beneath which lies the volume of material;

generator means for generating transient electromagnetic pulses within the transmitter means;

vehicle means for flying over said area of ground aboard which is a detector means;

detector means synchronized with said generator means for detecting electromagnetic fields resultant of such transient electromagnetic pulses, said electromagnetic fields having a magnitude and temporal characteristics;

receiver means for forming a receiver signal dependent upon the magnitude and temporal characteristics of the detected electromagnetic fields; and processor means for providing an output indicative of characteristics of the volume of material.

23. An assembly as in claim 22, wherein the detector means and the generator means are synchronized together thereby synchronizing the detection of the electromagnetic fields with a start of each of the transient electromagnetic pulses.

24. An assembly as in claim 22 further characterized in that the processing means produce an output from the received signal using transient electromagnetic analysis techniques which is interpretable as indicating characteristics of the volume of material.

25. An assembly as in claim 22 further characterized in that the processing means produces an output from the received signal using magnetometric resistivity analysis techniques which is interpretable as indicating characteristics of the volume of material.

26. An assembly as in claim 22 further characterized in that the processing means produces an output from the received signal using magnetic induced polarization analysis techniques which is interpretable as indicting characteristics of the volume of material.

27. An assembly as in claim 22 including:

digital means for forming a digital signal by repetitively digitally sampling the received signal; and memory means for storing the digital signal.

28. An assembly as in claim 22 where the vehicle means is an airplane, helicopter or balloon.

29. An assembly as in claim 22 including a first crystal oscillator within the detector means, a second crystal oscillator within the generator means for synchronizing the first and second crystal oscillators where the oscillators control respectively the generation of the transient electromagnetic pulses and the detection of the resultant electromagnetic field.

30. An assembly for interrogating a volume of material beneath the ground, the assembly including:

a loop antenna located to extend over and be supported by an area of ground encompassing and beneath which lies the volume of material or a grounded conductor or conductors located in an area of ground beneath which lies the volume of material;

generator means for generating transient electromagnetic pulses within the loop antenna or the ground conductor or conductors;

vehicle means for flying over said area of ground aboard which is a detector means;

detector means synchronized with said generator means for detecting electromagnetic fields resultant of such transient electromagnetic pulses, said electromagnetic fields having a magnitude and temporal characteristics;

receiver means for forming a received signal dependant upon the magnitude and temporal characteristics of the detected electromagnetic fields; and processor means for providing an output indicative of characteristics of the volume of material.

31. An assembly as in claim 30 wherein the detector means and the generator means are synchronized together thereby synchronizing the detection of the electromagnetic fields with a start of each of the transient electromagnetic pulses.

32. An assembly as in claim 30 further characterized in that the processing means produces an output from the received signal using transient electromagnetic analysis techniques which is interpretable as indicating characteristics of the volume of material.

33. An assembly as in claim 30 further characterized in that the processing means produces an output from the received signal using magnetometric resistivity analysis techniques which is interpretable as indicating characteristics of the volume of material.

34. An assembly as in claim 30 further characterized in that the processing means produces an output from the received signal using magnetic induced polarization analysis techniques which is interpretable as indicating characteristics of the volume of material.

35. An assembly as in claim 30 including:

digital means for forming a digital signal by repetitively digitally sampling the received signal; and memory means adapted to store the digital signal.

36. An assembly as in claim 30 where the vehicle means is an airplane, helicopter or balloon.

37. An assembly as in claim 30 including a first crystal oscillator within the detector means, a second crystal oscillator within the generator means, means for synchronizing the first and second crystal oscillators where the oscillators control respectively the generation of the transient electromagnetic pulses and the detection of the resultant electromagnetic field.

* * * * *